United States Patent [19]

Karady et al.

[11] 3,715,382
[45] Feb. 6, 1973

[54] N-ACYL-α-HYDRAZINO-β-(PHENYL) PROPIONITRILES

[75] Inventors: Sandor Karady, Elizabeth; Seemon H. Pines, Murray Hill; Manuel G. Ly, New Brunswick; Meyer Sletzinger, North Plainfield, all of N.J.

[73] Assignee: Merck & Co., Inc., Rahway, N.J.

[22] Filed: Feb. 5, 1970

[21] Appl. No.: 9,052

[52] U.S. Cl........260/465 D, 260/465 E, 260/471 A, 260/518 R, 260/519, 260/556 H, 260/558 H, 260/559 H, 260/999

[51] Int. Cl........C07c 101/72, C07c 103/28, C07c 121/78

[58] Field of Search...............260/465 D, 465 E

[56] References Cited

UNITED STATES PATENTS 3,032,581  5/1962  Leonard.....................260/465 X
3,505,385  4/1970  Reinhold et al................260/465

OTHER PUBLICATIONS

Smith: Open–Chain Nitrogen Compounds, Vol. 11, W. A. Benjamin, Inc., New York, N.Y., 1966, pp. 127–128.

*Primary Examiner*—Lewis Gotts
*Assistant Examiner*—Dolph H. Torrence
*Attorney*—Francis H. Deef, Harry E. Westlake, Jr. and I. Louis Wolk

[57] ABSTRACT

Diastereomers of N-acyl α-hydrazino-β-(substituted or unsubstituted phenyl) propionitriles which can be separated and hydrolyzed to give compounds useful as decarboxylase inhibitors.

5 Claims, No Drawings

N-ACYL-α-HYDRAZINO-β-(PHENYL) PROPIONITRILES

The present invention relates to novel and useful chemical compounds and to a process for their preparation. More particularly, it relates to chemical diastereomers which can be separated and then further reacted to give one stereoisomer in the substantial absence of the other stereoisomer.

It is known in the art that various α-hydrazino-β-(substituted or unsubstituted phenyl)alkanoic acids are useful as decarboxylase inhibitors (see U.S. Pat. No. 3,462,536). In general, one stereoisomer of the racemate is more desirable than the other. This is due to the fact that even in such closely related compounds there are variations in activity, toxicity, side effects and the like due to the stereo configuration. In the past, it has been the accepted practice to separate stereoisomers by the formation of diastereomeric salts with either optically active bases or acids, depending on the nature of the racemate. However, with the hydrazino compounds of the present invention, separation is complicated by the fact that some diastereomeric salts do not form crystalline materials with sufficiently different properties so that the diastereomers can be readily crystallized. In some instances, the diastereomeric salts are oily or waxy materials which become difficult if not impossible to separate by conventional means. Quite obviously, if a relatively simple and inexpensive process could be found which would preferentially produce the desired stereoisomer, it would receive widespread acceptance in the art.

It is an object of the present invention to prepare novel intermediates. A further object is to provide a process for the formation of such intermediates. A still further object is to provide a process for forming diastereomer intermediates which can be separated. A further object is to provide a process whereby the separate diastereomers may be formed into useful final products. Other objects will become apparent as the description of the invention proceeds.

These objects are accomplished by the present invention which provides a compound of the formula

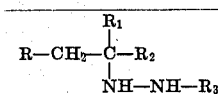

wherein
R is a substituted or unsubstituted phenyl radical containing less than about 25 carbon atoms;
$R_1$ is hydrogen or lower alkyl;
$R_2$ is $-CN$, $-CONH_2$, $-COOH$, $-COO$lower alkyl or $-COO$cation; and
$R_3$ is an acyl radical containing less than about 30 carbon atoms and having at least one asymmetric carbon atom, the acyl radical being predominantly in either the $d$ or $l$ form.

In a preferred embodiment of the present invention, R is a substituted phenyl radical preferably a 3-substituted, a 4-substituted or a 3,4-disubstituted phenyl radical and the acyl radical is essentially in either the $d$ or $l$ form. Preferably the substituents are alkoxy, aryloxy, aralkyloxy or hydroxy. Such substituents include methoxy, ethoxy, phenyloxy, benzyloxy and the like. In another preferred embodiment of the present invention, $R_1$ is either hydrogen or methyl.

The present invention also provides a process for preparing one enantiomorph of a compound of the formula

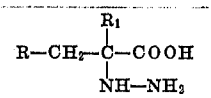

which comprises reacting a racemate of a compound of the formula

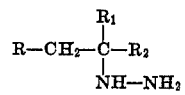

with predominantly one optical isomer of an acylating agent having at least one asymmetric carbon atom and containing less than about 30 carbon atoms in the acyl radical to form a compound of the formula

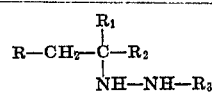

separating the diastereomers into its components and thereafter hydrolyzing at least one of the components with aqueous acid or base to form the desired product; wherein in each of the above structural formulas
R is a substituted or unsubstituted phenyl radical containing less than about 25 carbon atoms;
$R_1$ is hydrogen or lower alkyl;
$R_2$ is $-CN$, $-CONH_2$, $-COOH$, $-COO$lower alkyl or $-COO$cation; and
$R_3$ is an acyl radical containing less than about 30 carbon atoms and having at least one asymmetric carbon atom, the acyl radical being predominantly in either the $d$ or $l$ form.

The present invention further provides a process for preparing a compound of the formula

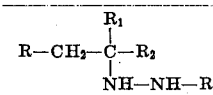

which comprises reacting a compound of the formula

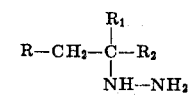

with predominantly one optical isomer of an acylating agent having at least one asymmetric carbon atom and containing less than about 30 carbon atoms in the acyl radical; wherein
R is a substituted or unsubstituted phenyl radical containing less than about 25 carbon atoms;
$R_1$ is hydrogen or lower alkyl;
$R_2$ is $-CN$, $-CONH_2$, $-COOH$, $-COO$lower alkyl or $-COO$cation; and $R_3$ is an acyl radical containing less than about 30 carbon atoms and having at least one asymmetric carbon atom, the acyl radical being predominantly in either the *d* or *l* form.

The present invention still further provides a process for preparing at least one enantiomorph of a compound of the formula

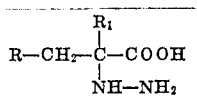

which comprises hydrolyzing at least one diastereomer of a compound of the formula

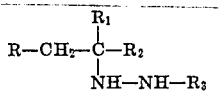

with aqueous acid or base to form the desired product; wherein

R is a substituted or unsubstituted phenyl radical containing less than about 25 carbon atoms;

$R_1$ is hydrogen or lower alkyl;

$R_2$ is $-CN$, $-CONH_2$, $-COOH$, $-COO$lower alkyl or $COO$cation; and $R_3$ is an acyl radical containing less than about 30 carbon atoms and having at least one asymmetric carbon atom, the acyl radical being predominantly in either the *d* or *l* form.

In carrying out the acylation reaction in the present invention, any of the conventional optically active acylating agents may be used. For example, an optically active organic acid with carbodiimides and the like may be used as well as organic anhydrides, mixed anhydrides, halides, azides, esters and the like. In general, the acylation is carried out in a solvent at a temperature ranging from $-70°$ to $+150°C$. Suitable solvents include water, methanol, ethanol, ethyl acetate, diethyl ether, hexane, chloroform, methylene chloride and the like. Other solvents such as pyridine and other organic amines can also be used, particularly with acyl halides, since they react with the hydrohalic acid which is formed in the reaction. In general when using acyl halides, an inorganic or an organic base is utilized for the same purpose as pyridine, i.e. to bind the hydrohalide given off. The acylation reaction is generally carried out using a slight excess of the acylating agent to insure complete reaction of the hydrazine compound. In a preferred embodiment of the present invention, the reaction is carried out using an acyl halide at a temperature of $-30°C$. to $+100°C$. and more preferably from $-15°C$. to $+80°C$.

While any optical active acylating agent can be used to form the intermediates of the present invention, it is preferred that the acyl group contain less than about 30 carbon atoms in the molecule. Among the various acylating agents which may be used are the acid halides, anhydrides, azides, mixed anhydrides, etc. of either the *d* or *l* form of camphoric acid, camphorsulfonic acid, dibenzoyltartaric acid, ditolyltartaric acid, malic acid, pyroglutamic acid, menthylchloroformate, α-methyl-α-phenylacetic acid, atrolactic, menthoxyacetic acid, or the like. Derivatives of such *d* or *l* acids may also be used. Other natural acids containing a natural stereo configuration such as cholic acid may also be employed.

In referring to stereoisomers, it should be noted that a distinction is made between absolute configuration and optical rotation. The use of the D or L refers to absolute configuration which may differ from or be the same as the *d* or *l* of the optical rotation. Similarly, the *d* or *l* refers to optical rotation and does not refer to absolute configuration. In other words, when *l* is given the compound is levorotatory and when *d* is given the compound is dextrorotatory. Since the D and L are not related to optical rotation but rather to steric configuration, these letters do not indicate the direction of rotation. In the following discussion, the L and D refer to the hydrazine portions of the molecule since the absolute configurations of these compounds are known and generally used in the art. In contrast, the acylating agents are generally known and given the *l* or *d* designation depending upon their optical rotation. Since this is conventional, it is followed in the discussion and examples.

After forming the acylated intermediate product of the present invention, it is to be noted that the product is now a diastereomer containing at least two asymmetric carbon atoms. Since one optical isomer of the acylating agent has been used, the intermediate diastereomer contains one of the two following A or B pairs; (A) L *d* and D *d* or (B) L *l* and D *l* — with D or L referring to the absolute stereo configuration of the hydrazine portion of the molecule and *d* and *l* referring to the optical rotation of the acyl portion. Thus, when the *d* acyl compound is used, the diastereomers will be pair (A) above and when the *l* acyl compound is used, the diastereomers will be pair (B). The diastereomers in each of the pairs will now have sufficiently different properties so as to be separated by conventional means. In general, the diastereomers are separated from the mixture by fractional crystallization (either with or without seeding), chromatography or by other conventional means of resolution. While seeding of a supersaturated solution of the mixture is the preferred method of separation, it is obvious that some resolution must first occur before any seed crystals are available. With seed crystals, the process can be speeded considerably and increased yields are generally obtained.

After resolution of the mixture into its diastereomers, each of the diastereomers can be hydrolyzed with aqueous acid or base under moderate conditions to remove the acyl group. When other substituent groups such as the 3,4-dimethoxy or 3,4-dibenzyloxy are present in the R group, these can simultaneously be converted to hydroxyl groups under somewhat more drastic conditions for hydrolysis. Similarly, the various $R_2$ groups can be converted to the carboxyl group by varying the hydrolysis conditions. In general, the hydrolysis is carried out at a temperature of from about room temperature to 175°C., preferably 75°C. to 165°C. When it is desired to simultaneously convert the 3,4-dimethoxy or 3,4-dibenzyloxy to hydroxyl groups along with hydrolysis of the acyl radical, it is preferred that a concentrated (preferably fortified) hydrohalic acid be used at a temperature of from 100°C. to 165°C. When such substituents are not present or it is not desired to convert the substituent groups, much less drastic conditions can be used and either an acid or a base in water will suffice for hydrolysis.

The expression "unsubstituted phenyl" merely signifies the

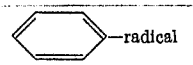—radical containing no substituents and the term "substituted" signifies such a ring containing other organic radicals attached to the ring as hereinbefore pointed out. In a preferred embodiment of the present invention, R contains less than 25 carbon atoms and is a 3,4-disubstituted phenyl radical wherein the substituents are converted to hydroxyl groups. The "lower alkyl" radical signifies an alkyl group containing from one to about six carbon atoms which can be straight chained or branched. The term "cation" is used in its conventional sense to mean any inorganic or organic, positively charged atom or radical. It includes the cations from such basic materials as calcium hydroxide, sodium hydroxide, potassium hydroxide, etc. as well as the cations from cyclohexylamine, triethylamine, phenethylamine and the like. Such bases react with the carboxyl group of the hydrazine compound to form salts of the structure given in the formula. The "acyl" radical is any organic radical derived from an organic acid by the removal of the hydroxyl group. It includes such radicals derived from carboxylic acids, sulfonic acids and the like.

The phrase "acylating agent" is used in its broadest sense to mean any reactant which will coupled with the hydrazino group to form the —NH—NH—acyl group. Such acylating agents are well known in the art and, as hereinbefore pointed out, include acids, acyl halides, azides, etc. The terminology "predominantly" merely signifies that one of the optical isomers is present in an amount over 50 percent. In general, such isomers will be "essentially" the $l$ or the $d$ and thus contain 90 percent or more, preferably 100 percent, of one isomer. In practice, it is desirable to use a single isomer in as pure a state as is readily obtainable commercially. Thus, when such isomers are commercially obtainable as essentially 100 percent $l$ or $d$, these are employed in order to obtain the highest possible yields. When such purified isomers are not available, mixtures may be used which contain somewhat more of one isomer than the other but the yields are substantially diminished as the mixture approaches racemic proportions. In carrying out the "hydrolysis" of the present invention, either an aqueous acid or an aqueous base may be employed. In order to convert substituent groups such as alkoxy and benzyloxy into the corresponding hydroxyl groups during hydrolysis, the more drastic conditions of concentrated hydrohalic acid and more elevated temperatures are desired for substantial yields.

The following examples are given to illustrate the invention and are not intended to limit it in any manner. All parts are given in parts by weight unless otherwise expressed. Where a reactant is given the L, D, $l$ or $d$ designation, it signifies that the reactant is substantially 100 percent in the indicated stereo configuration or optical form.

EXAMPLE 1

A. Preparation and separation of diastereomers of α-($l$-menthoxyacetylhydrazo)-α-methyl-β-(4-hydroxy-3-methoxyphenyl)propionitrile To a cool (10°C.) solution of racemic α-hydrazino-α-methyl-β-(4-hydroxy-3-methoxyphenyl)propionitrile (92.3 g., 0.435 moles) in dioxane (2 liters) and tetrahydrofuran (500 ml.) is added simultaneously l-menthoxy-acetyl chloride (100 g., 0.435 moles) and triethylamine (58 ml., 0.41 mole). The mixture is agitated at room temperature overnight. The solvents are removed by vacuum distillation by utilizing a hot water bath. The residue is then partitioned between water and ethyl acetate. The ethyl acetate layer is separated and dried over sodium sulfate. The solvent is removed by vacuum distillation, leaving an oily mixture of the two diastereomers. The oily mixture is dissolved in ethyl acetate and hexane is added to turbidity. The L l-diastereomer crystalline product is filtered and recovered in a yield of 66 g., leaving 130 g. of syrup containing the D l-diastereomer. The crystalline material is recrystallized three times from ethyl acetate-hexane by dissolving the material in ethyl acetate and adding hexane to turbidity. The pure L α-(l-menthoxyacetylhydrazo)-α-methyl-β-(4-hydroxy-3-methoxyphenyl)propionitrile is obtained in a yield of 12 g.

The physical constants are: m.p. 126–126.5°; $[\alpha]^{MeOH}_{546}$ −47.1°.

Anal. calcd. for $C_{23}H_{35}O_4N_3$: C, 66.16; H, 8.45; N, 10.06

Found: C, 66.21; H, 8.68; N, 10.23.

B. Preparation of L-α-hydrazino-α-methyl-β-(3,4-dihydroxyphenyl)propionic acid

Methanol (25 ml.) and concentrated hydrochloric acid (30 ml.) are saturated with hydrogen chloride gas. To this solution is added the L α-(l-menthoxyacetylhydrazo)-α-methyl-β-(4-hydroxy-3-methoxyphenyl)propionitrile (3 g., 7.22 m.moles) obtained above and the mixture is agitated overnight at room temperature. The solution is evaporated to dryness and the residue dissolved in a mixture of hydrochloric acid (45 ml.) and acetic acid (5 ml.). The solution is heated in a sealed tube at 120°C. for 1½ hours. A dark solution results which is evaporated to dryness and the product is leached out with ethanol (25 ml.). The hydrazino acid is precipitated by the addition of diethylamine to pH 6.5 and 5 ml. of benzene. The crude product is obtained in a yield of 1.1 g., 58 percent and it is dissolved in boiling water (50 ml.), slurried with charcoal and filtered. The material is dissolved and crystallized from boiling water (50 ml.) containing sodium bisulfite (50 mg.) and versene (5 mg.). The pure L-α-hydrazino-α-methyl-β-(3,4-dihydroxyphenyl)propionic acid has the following physical properties:
m.p. 203–205° (dec);
$[\alpha]_D = -17.3°$ (C=2, $CH_3OH$).

Anal. calcd. for $C_{10}H_{14}N_2O_4 \cdot H_2O$: C, 49.17; H, 6.60; N, 11.47

Found: C, 49.13; H, 6.74; N, 11.19.

C. Preparation of D-α-hydrazino-α-methyl-β-(3,4-dihydroxyphenyl)propionic acid

Twenty grams of the oily mixture of Procedure A (containing the D l diastereomer) is heated in a sealed tube with concentrated hydrochloric acid (300 ml.) and acetic acid (25 ml.) to 120°C. for 2 hours. The resulting solution is evaporated to dryness and the product leached out with ethanol (25 ml.). The hydrazino acid is precipitated by the addition of diethylamine (pH 6.5) and 5 ml. of benzene. The crude product is dissolved in boiling water, slurried with charcoal and filtered. The filtrate is concentrated by vacuum distillation and the product crystallized by cooling. The resulting crystals are recrystallized twice from water to yield pure D-α-hydrazino-α-methyl-β-(3,4-dihydroxyphenyl)propionic acid in a yield of 0.7 g., m.p. 205° (dec);
$[\alpha]_D = +17.3°$ (C=2, CH$_3$OH).
Anal. found: C, 49.15; H, 6.45; N, 11.18.

EXAMPLE 2

A. Preparation and separation of diastereomers of α-(l-menthoxyacetylhydrazo)-α-methyl-β-(3,4-dibenzyloxyphenyl)propionitrile To a cooled (10°C.) solution of α-hydrazino-α-methyl-β-(3,4-dibenzyloxyphenyl)propionitrile (1 mole) and l-menthoxyacetic acid (1 mole) in 1 liter of dioxane is added dropwise a solution of dicyclohexylcarbodiimide (1.1 mole) in 300 ml. of dioxane. After 2 hours, the mixture is filtered and the solvent is removed in vacuo from the filtrate to yield the two diastereomers of α-(l-menthoxyacetylhydrazo)-α-methyl-β-(3,4-dibenzyloxyphenyl)propionitrile.

The diastereomers are separated by the procedure given in Example 1A.

B. Preparation of L and D-α-hydrazino-α-methyl-β-(3,4-dihydroxyphenyl)propionic acid Each of the diastereomers is hydrolyzed by the procedure of Example 1B to give the corresponding L and D-α-hydrazino-α-methyl-β-(3,4-dihydroxyphenyl)propionic acid.

EXAMPLE 3

A. Preparation and separation of diastereomers of α-(d-10-camphorsulfonylhydrazo)-α-methyl-β-(3,4-dimethoxyphenyl)propionitrile A solution of racemic α-hydrazino-α-methyl-β-(3,4-dihydroxyphenyl)propionitrile (10 m.moles) and p-nitrophenyl d-10-camphorsulfonate (10 m.moles) in 20 ml. of dioxane as a solvent is refluxed for two hours. The solvent is removed in vacuo and the residue is partitioned between chloroform and sodium carbonate solution (10 percent in water). The chloroform solution is dried and evaporated to give the D and L mixture of α-(d-10-camphorsulfonylhydrazo)-α-methyl-β-(3,4-dimethoxyphenyl)propionitrile.

The diastereomers are separated by the procedure given in Example 1A.

B. Preparation of L and D-α-hydrazino-α-methyl-β-(3,4-dihydroxyphenyl)propionic acid Each of the diastereomers is hydrolyzed by the procedure of Example 1B to give the corresponding L and D-α-hydrazino-α-methyl-β-(3,4-dihydroxyphenyl)propionic acid.

EXAMPLE 4

A. Preparation and separation of diastereomers of α-methyl-α-(d-pyroglutamoylhydrazo)-β-(3-hydroxy-4-methoxyphenyl)propionamide To a chilled solution of d-pyroglutamic acid (10 m.moles) and triethylamine (20 m.moles) in 100 ml. of tetrahydrofuran is added dropwise ethyl chloroformate (10 m.moles). After 30 minutes, the supernatant is decantered and added to an ice-cold solution of racemic α-hydrazino-α-methyl-β-(3-hydroxy-4-methoxyphenyl)propionamide hydrochloride (9 m.moles) in 25 ml. of tetrahydrofuran. The mixture is allowed to mix at room temperature for 1 hour and the solution is then evaporated and the residue partitioned between chloroform and water. The chloroform portion is dried and evaporated to give the D and L mixture of α-methyl-α-(d-pyroglutamoylhydrazo)-β-(3-hydroxy-4-methoxyphenyl)propionamide.

The diastereomers are separated by the procedure given in Example 1A.

B. Preparation of L and D-α-hydrazino-α-methyl-β-(3,4-dihydroxyphenyl)propionic acid Each of the diastereomers is hydrolzed by the procedure of Example 1B to give the corresponding L and D-α-hydrazino-α-methyl-β-(3,4-dihydroxyphenyl)propionic acid.

EXAMPLE 5

A. Preparation and separation of diastereomers of α-(choloylhydrazo)-α-methyl-β-(3,4-dimethoxyphenyl)-propionamide A mixture of cholic acid azide (10 m.moles) and racemic α-hydrazino-α-methyl-β-(3,4-dimethoxyphenyl)-propionitrile (10 m.moles) are allowed to stand in 50 ml. of a pyridine solution for 1 day. The solution is diluted with 500 ml. of water and the D and L mixture of α-(choloylhydrazo)-α-methyl-β-(3,4-dimethoxyphenyl)-propionamide is removed by filtration.

The diastereomers are separated by the procedure given in Example 1A.

B. Preparation of L and D-α-hydrazino-α-methyl-β-(3,4-dihydroxyphenyl)propionic acid Each of the diastereomers is hydrolyzed by the procedure of Example 1B to give the corresponding L and D-α-hydrazino-α-methyl-β-(3,4-dihydroxyphenyl)propionic acid.

EXAMPLE 6

A. Preparation and separation of diastereomers of α-(l-menthoxyacetylhydrazo)-α-methyl-β-(3,4-dimethoxy-phenyl)propionic acid To an ice-cold solution of racemic α-hydrazino-α-methyl-β-(3,4-dimethoxy)propionic acid (10 m.moles) in a 2 percent sodium bicarbonate solution (50 ml.) is added l-menthoxy chloroformate (12 m.moles) and the mixture is agitated for three hours. The mixture is acidified to a pH of 3 and the product is removed by filtration. The resulting product is a D and L mixture of α-(l-menthoxyacetylhydrazo)-α-methyl-β-(3,4-dimethoxyphenyl)propionic acid.

The sodium salt of the D and L mixture is made by dissolving the mixture in ethanol and then treating it with one equivalent of sodium hydroxide. The sodium salt precipitates from solution and it is resolved in the same manner as in Example 1A using methanol/water rather than ethyl acetate/hexane for solution and precipitation.

The cyclohexylamine salt of the D and L mixture is formed by dissolving the mixture in ether and then treating the solution with an equivalent amount of cyclohexylamine. The cyclohexylamine salt precipitates from the solution and is resolved in the same manner as in Example 1A using methanol/ether rather than ethyl acetate/hexane for solution and precipitation.

The methyl ester of the D and L mixture is formed by dissolving the mixture in dioxane and treating with an excess of ethereal diazomethane. The methyl ester is obtained by removing the solvents. This is resolved in the same manner as in Example 1 using ethyl acetate and hexane.

EXAMPLE 7

A. Preparation and separation of diastereomers of methyl α-(d-O-acetylatrolactylhydrazo)-β-phenylpropionate Racemic α-hydrazino-β-phenylpropionic acid (90.11 g., 0.5 mole) is dissolved in methanol (200 ml.). The solution is saturated with gaseous hydrogen chloride at room temperature (25°) and the mixture is allowed to stand for 40 hours. The racemate solution is concentrated to dryness in vacuo, flushed once with methanol and is again dissolved in methanol (200 ml.). To the solution is added diethylamine to pH 8. The mixture is chilled to 0°, is allowed to stand for 1 hour, is filtered and the precipitate is dried to yield racemic methyl α-hydrazino-β-phenyl-propionate.

d-Atrolactic acid (83.09 g., 0.5 mole) is dissolved in pyridine (700 ml.) and treated at 0° with acetyl chloride (66.1 ml.). The mixture is stirred at 0° for 1 hour and with stirring is allowed to warm spontaneously to 25°C. Water and benzene are added and the benzene layer is washed successively with diluted (1 N) hydrochloric acid, water and saturated salt solution. The benzene layer is dried (MgSO₄) and concentrated in vacuo to a residue which is crystallized from "isooctane" to yield d-O-acetylatrolactic acid.

To d-O-acetylatrolactic acid (83.09 g., 0.5 mole) is added with cooling thionyl chloride (119.0 g., 1.0 mole). With stirring the mixture is heated to reflux and maintained for 2 hours. The mixture is concentrated in vacuo at 50° to remove excess thionyl chloride and dissolved gases, and the resulting product is the acid chloride.

To racemic methyl α-hydrazino-β-phenylpropionate (97.12 g., 0.5 mole) is mixed pyridine (300 ml.) with cooling and to the mixture with stirring and cooling to 20–25°A is added d-O-acetylatrolactyl chloride from the previous step. The mixture is allowed to stand overnight at 25°, is concentrated in vacuo and the residue recrystallized from methanol/water to yield L-enriched methyl α-(d-O-acetylatrolactylhydrazo)-β-phenylpropionate.

B. Preparation of L-α-hydrazino-β-phenylpropionic acid

The L-enriched methyl ester from Procedure A above (38.44 g., 0.1 mole) is hydrolyzed with 6 N hydrochloric acid (150 ml.) for two hours at reflux. The mixture is cooled to room temperature and extracted with ether. After drying (MgSO₄) the ethereal solution is concentrated to recover the d-atrolactic acid. The aqueous phase is concentrated to dryness, taken up in methanol and diethylamine added to pH 6.0. After 1 hour at room temperature L-α-hydrazino-β-phenylpropionic acid is separated by filtration and recrystallized from water containing 0.5 g. sodium bisulfite.

The mother liquors from the L-enriched compound (highly enriched in D-enantiomorph) are hydrolyzed with base to racemize the material for further resolution. Mother liquors from recrystallized L-compound are appropriately combined for additional crops of product.

Many other equivalent modifications of the invention would be apparent to those skilled in the art from a reading of the foregoing without a departure from the inventive concept.

What is claimed is:

1. A compound of the formula

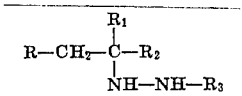

wherein

R is an unsubstituted phenyl radical, a 3-substituted phenyl radical, a 4-substituted phenyl radical or a 3,4-disubstituted phenyl radical wherein the substituents are hydroxy or lower alkoxy, phenyloxy or benzyloxy;

$R_1$ is hydrogen or lower alkyl;

$R_2$ is —CN; and $R_3$ is an acyl radical containing less than about 30 carbon atoms and having at least one asymmetric carbon atom, the acyl radical being predominantly in either the $d$ or $l$ form and being derived from a carboxylic or a sulfonic acid.

2. The compound of claim 1 wherein R is a 3,4-disubstituted phenyl radical.

3. The compound of claim 1 wherein $R_1$ is hydrogen.

4. The compound of claim 1 wherein $R_1$ is methyl.

5. The compound of claim 1 wherein $R_3$ is the menthoxyacetyl radical.

* * * * *